United States Patent
Arnaud

(10) Patent No.: US 8,615,005 B2
(45) Date of Patent: Dec. 24, 2013

(54) SYSTEM AND METHOD FOR PLACING A CALL USING A LOCAL ACCESS NUMBER SHARED BY MULTIPLE USERS

(75) Inventor: Jérôme Arnaud, St-Constant (CA)

(73) Assignee: Sabse Technologies, Inc., Mountain View, CA (US)

( * ) Notice: Subject to any disclaimer, the term of this patent is extended or adjusted under 35 U.S.C. 154(b) by 1040 days.

(21) Appl. No.: 12/249,605

(22) Filed: Oct. 10, 2008

(65) Prior Publication Data

US 2010/0091761 A1 Apr. 15, 2010

(51) Int. Cl.
*H04L 12/66* (2006.01)

(52) U.S. Cl.
USPC .......................................................... 370/352

(58) Field of Classification Search
USPC ............ 370/354, 329; 455/428, 435.2, 426.1, 455/420; 709/249; 726/12; 379/93.17; 704/275
See application file for complete search history.

(56) References Cited

U.S. PATENT DOCUMENTS

| | | | |
|---|---|---|---|
| 4,313,035 A | 1/1982 | Jordan et al. | |
| 4,475,009 A | 10/1984 | Rais et al. | |
| 4,680,785 A | 7/1987 | Akiyama et al. | |
| 4,878,243 A | 10/1989 | Hashimoto | |
| 5,315,636 A | 5/1994 | Patel | |
| 5,329,578 A | 7/1994 | Brennan et al. | |
| 5,933,483 A | 8/1999 | Pellegrino et al. | |
| 5,946,618 A * | 8/1999 | Agre et al. .................... | 455/428 |
| 6,205,126 B1 * | 3/2001 | Moon ........................... | 370/329 |
| 6,304,565 B1 * | 10/2001 | Ramamurthy ................. | 370/352 |
| 7,184,527 B1 * | 2/2007 | Lin et al. ...................... | 379/93.17 |
| 7,197,124 B2 | 3/2007 | Hutchinson, IV | |
| 7,466,810 B1 * | 12/2008 | Quon et al. .............. | 379/201.01 |
| 7,640,580 B1 * | 12/2009 | Plotnikov et al. ............... | 726/12 |
| 2005/0076150 A1 * | 4/2005 | Lee et al. ...................... | 709/249 |
| 2008/0102809 A1 * | 5/2008 | Beyer ........................... | 455/420 |
| 2008/0154612 A1 * | 6/2008 | Evermann et al. ............. | 704/275 |
| 2008/0167039 A1 * | 7/2008 | Guedalia et al. ........... | 455/435.2 |
| 2008/0293403 A1 * | 11/2008 | Quon et al. ................ | 455/426.1 |

* cited by examiner

*Primary Examiner* — Asad Nawaz
*Assistant Examiner* — Parth Patel
(74) *Attorney, Agent, or Firm* — Lathrop & Gage LLP

(57) ABSTRACT

The present document describes a method and system for placing a call through an Internet Protocol (IP) network, from a contact voice interface device for use by a contact user located in a first geographical area, to a subscribed voice interface device for use by a subscribed user located in a second geographical area, each geographical area defined by an area in which a local call can be made. The method comprises: assigning a local access phone number to the first geographical area; the contact user initiating a first leg of the call, from the contact voice interface device to a first IP switch, by dialing the local access phone number using the contact voice interface device; the contact user providing an identity of the subscribed voice interface device to which the call is to be completed; transmitting the identity from the first IP switch to a second IP switch via the IP network, the second IP switch associated with the identity of the subscribed voice interface device provided; the second IP switch establishing a second leg of the call at a local calling rate to the subscribed voice interface; and bridging the first leg of the call to the second leg of the call through the IP network, thereby completing the call from the contact voice interface device to the subscribed voice interface device through the IP network.

17 Claims, 3 Drawing Sheets

SYSTEM AND METHOD FOR PLACING A CALL USING A LOCAL ACCESS NUMBER SHARED BY MULTIPLE USERS

CROSS-REFERENCE TO RELATED APPLICATIONS

This is the first application filed for the invention(s) described herein.

TECHNICAL FIELD

This description relates to the field of telecommunications. More particularly, this description relates to methods and systems for placing calls between different geographical areas.

BACKGROUND

Users of voice communication devices and operators of voice networks wish to reduce or eliminate the cost of calls between different geographical areas. The emergence of the Voice-over-Internet-Protocol (VoIP) has greatly helped in this endeavor.

The present document describes improvements in voice call applications.

SUMMARY

In accordance with an embodiment, there is provided a method for placing a call through an Internet Protocol (IP) network, from a contact voice interface device for use by a contact user located in a first geographical area, to a subscribed voice interface device for use by a subscribed user located in a second geographical area, each geographical area defined by an area in which a local call can be made. The method comprises: assigning a local access phone number to the first geographical area; the contact user initiating a first leg of the call, from the contact voice interface device to a first IP switch, by dialing the local access phone number using the contact voice interface device; the contact user providing an identity of the subscribed voice interface device to which the call is to be completed; transmitting the identity from the first IP switch to a second IP switch via the IP network, the second IP switch associated with the identity of the subscribed voice interface device provided; the second IP switch establishing a second leg of the call at a local calling rate to the subscribed voice interface; and bridging the first leg of the call to the second leg of the call through the IP network, thereby completing the call from the contact voice interface device to the subscribed voice interface device through the IP network.

In accordance with another embodiment, there is provided a system for placing a call through an Internet Protocol (IP) network, from a contact voice interface device for use by a contact user located in a first geographical area, to a subscribed voice interface device for use by a subscribed user located in a second geographical area. Each one of the first and second geographical areas is defined by an area in which a local call can be made. The system comprises a first IP switch being locally accessible to the contact voice interface device for establishing a first leg of the call, and having access to the IP network. The first leg of the call is established by the contact user dialing a local access phone number assigned to the first geographical area using the contact voice interface device. The system further comprises a second IP switch accessible via the IP network, for establishing a second leg of the call at a local calling rate, to the subscribed voice interface device, upon receiving an identity of the subscribed voice interface device provided by the contact user and transmitted from the first IP switch to the second IP switch over via the IP network. The system further comprises a bridge server accessible via the IP network. The bridge server is for bridging the first leg of the call to a second leg of the call through the IP network thereby completing the call from the contact voice interface device to the subscribed voice interface device.

In accordance with yet another embodiment, there is provided a server for completing a call through an Internet Protocol (IP) network, from a first IP switch being locally accessible by a contact voice interface device for use by a contact user located in a first geographical area, to a second IP switch having local access to a subscribed voice interface device for use by a subscribed user located in a second geographical area. The bridge server comprises an access to the IP network. The server further comprises a database. The database comprises a correspondence between the second IP switch and an identity of the subscribed voice interface device. The server further comprises an application coupled to the database. The application is configured for: upon a first leg of the call being established from the contact voice interface device to the first IP switch by the contact user dialing a local access phone number assigned to the first geographical area, receiving an identity of the subscribed voice interface device to which the call is to be completed from the first IP switch; retrieving from the database the second IP switch corresponding to the identity received; transferring the identity to the second IP switch to enable the second IP switch to establish a second leg of the call, at a local calling rate, to the subscribed voice interface device associated with the identity; and establishing a communication over the IP network, to both the first IP switch and the second IP switch, thereby linking the first leg of the call to the second leg of the call and completing the call.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION

Figure 1:
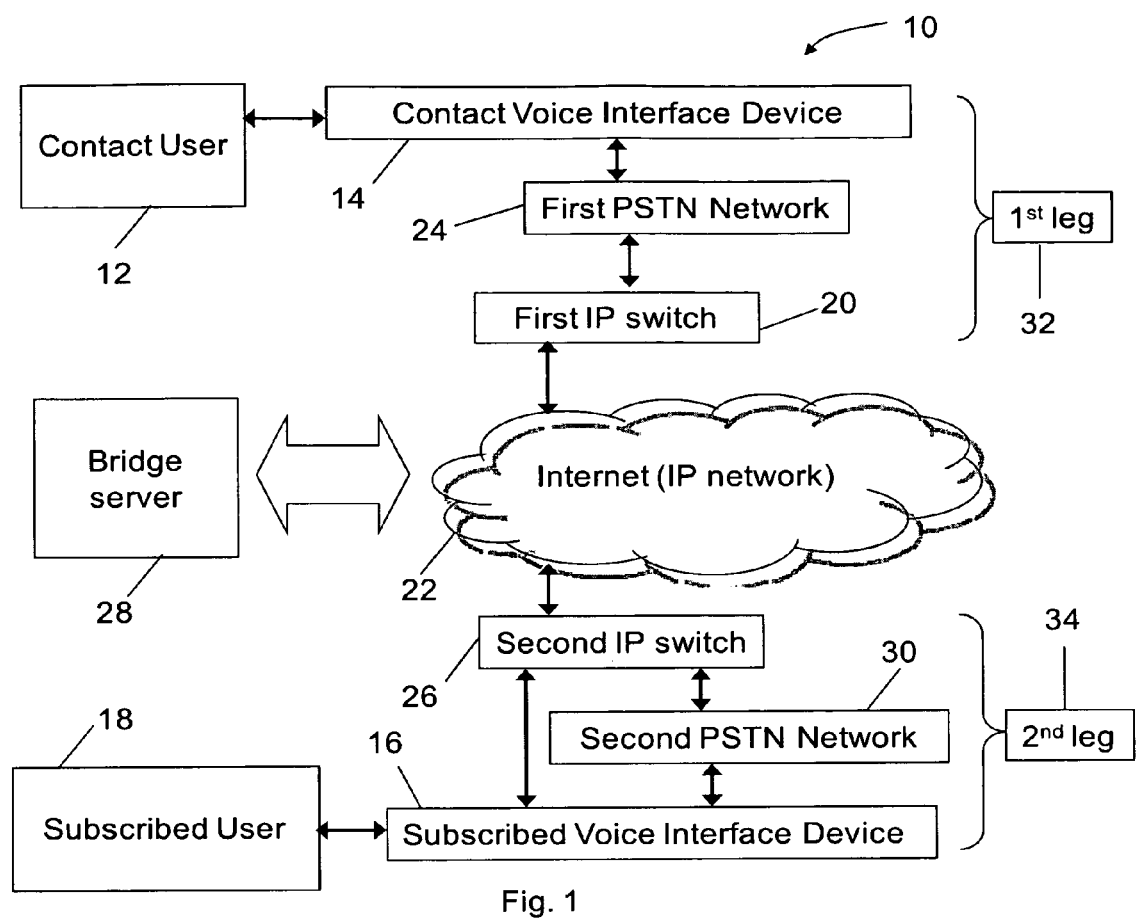
FIG. 1 is a block diagram illustrating an overview of a network configuration in which are set and operated a system and a method for placing a call according to an embodiment of the subject matter described herein.

Referring now to the drawings, and more particularly to FIG. 1, there is illustrated a schematic of a network configuration 10 in which are set and operated the system and method of the present description in accordance with an embodiment.

FIG. 1 shows a contact user 12 located in a first geographical area, who wishes to place a call from a contact voice interface device 14, to a subscribed voice interface device 16 of a subscribed user 18 located in a second geographical area. It should be noted that the network configuration 10 also allows the possibility for a plurality of contact users 12 to place a call to any one of a plurality of subscribed users 18.

The terms "contact" and "subscribed" used to distinguish the users are meant to indicate that at least one of the users is subscribed with the system (i.e., the subscribed user 18), for the contact user 12 to be able to reach the subscribed user 18 by dialing the local access number corresponding to the geographical area. A subscribed user 18 is informed of all access numbers which he can give to any number of contacts as well as his own identification number so he can be easily reached. The contact user 12 may or may not be registered with the operator of the systems described herein.

The contact voice interface device 14 can be any type of voice device which has the ability to access the Internet 22, via a first Internet Protocol (IP) switch 20, and through a first Public Switch Telephone Network (PSTN) 24, by dialing a local access phone number. The contact voice interface device 14 can be a conventional phone (mobile or landline), a satellite phone, or a combination of a VoIP device or an SMS (Short Message Service) device with a VoIP-to-PSTN switch (not shown) for sending the call via the first PSTN network 24.

Similarly, the subscribed user 18 uses a subscribed voice interface device 16 which can be any type of voice device having the ability to establish a communication with the Internet 22, via the second IP switch 26. The communication with the Internet 22 may be made directly or through a second PSTN network 30.

Although the Figures and the description refer to a first and second PSTN, it is understood that it is meant to incorporate other types of telephone networks such as a cellular network.

The subscribed voice interface device 16 can be a conventional phone (mobile or landline) or a satellite phone, in which case the communication with the second IP switch 26 is established via the second PSTN network 30. The subscribed voice interface device 16 can also be a SKYPE interface, a VoIP device (such as a VoIP phone, a VoIP client or a Soft Phone) or an SMS (Short Message Service) device, in which case the communication with the second IP switch 26 is established directly in IP format; i.e., directly to the Internet 22.

To place the call, the contact user 12 initiates a first leg 32 of the call by dialing a local access phone number (also referred to in the art as a Direct Inward Dialing (DID) number, or Direct Dial-In (DDI) number in Europe) which connects to the first IP switch 20 through the first PSTN network 24.

It is noted that the local access phone number dialed using the contact voice interface device 14 is associated with one geographical area and can be used by a plurality of contact users 12 to place a call to any one of a plurality of subscribed users 18.

A geographical area is defined as an area for which a call is local; i.e., a portion of a call made within this area can be made at a local calling rate. A single geographical area can have multiple local access phone numbers associated thereto. The local access phone number associated with one geographical area, or one IP switch, can be used to receive multiple simultaneous calls from contact users 12 wanting to place a call to a plurality of subscribed users 18 located anywhere in the world. Each subscribed user 18 is informed of all access numbers which he can give to any number of contacts as well as his own identification number so he can be easily reached just as if he was located within a local calling range.

Still referring to FIG. 1, once the first leg of the call 32 is initiated by the contact user 12, the first IP switch 24 directs the first leg 32 from the first PSTN network 24 to the Internet 22.

The contact user 12 then provides an identity of the subscribed voice interface device 16 to which the call is to be completed. The identity can be any entry which enables the identification of the subscribed voice interface device 16. Once the identity of the subscribed voice interface device 16 is known, the identity is transferred to the second IP switch 26 via the Internet 22.

The second IP switch 26 then establishes a second leg of the call 34, to the subscribed voice interface device 16.

Since the second IP switch 26 has an optional access to the second PSTN network 30 which is local to the subscribed voice interface device 16, the second leg of the call 34 can be established at a local calling rate, to a subscribed voice interface device 16 having a PSTN type number or access to PSTN network 30.

The Internet 22 bridges the first leg of the call 32 to the second leg of the call 34, from the first IP switch 20 to the second IP switch 26 to complete the call from the contact user 12 to the subscribed user 18.

The network configuration 10 has a bridge server 28 accessible via the Internet 22. The bridge server 28 will be discussed in conjunction with FIG. 2. It is possible to have more than one bridge server 28 within the network configuration 10. For example, each large geographical area of the globe can have one dedicated bridge server 28. All the bridge servers 28 can then communicate with each other via the Internet 22.

The functionalities of bridge server 28 include taking the subscribed user personal identifier as dialed by the contact user 12, finding the corresponding IP switch (second IP switch 26) to which a connection will be made as well as the corresponding phone number or subscribed voice interface device 16 to reach, making the call and bridging the first and the second leg of the call.

Although not illustrated, the first IP switch 20 of the network configuration 10 has an input for receiving the first leg 32 of the call from the contact voice interface device 14 through the first PSTN 24. The first IP switch 20 can further have a mapping device (not shown) for switching the call from the first PSTN 24 to a given URL address over the Internet 22, which points to any server such as the bridge server 28.

Similarly, the second IP switch 26 of the network configuration 10 has an input for receiving a VoIP call established from the first IP switch over the Internet 22, and a mapping device (not shown) for switching the call from a given URL which points to any server such as the bridge server 28, to the subscribed voice interface device 16.

If the subscribed voice interface device 16 is a VoIP device, an SMS messaging device, or any other web phone device, the second IP switch 26 simply directs the call to the subscribed voice interface device 16 over the Internet 22. If the subscribed voice interface device 16 is a regular phone having access to the second PSTN network 30, the mapping device (not shown) of the second IP switch 26 switches the call received from VoIP format to the second PSTN 30, from a given URL which points to the bridge server 28 on the Internet 22.

It is noted that in FIG. 1, the PSTN networks 24 and 30 may be sub-networks of the same PSTN network, or the same PSTN network. The Internet 22 can also be any type of network such as an Internet protocol (IP) network.

Figure 2:
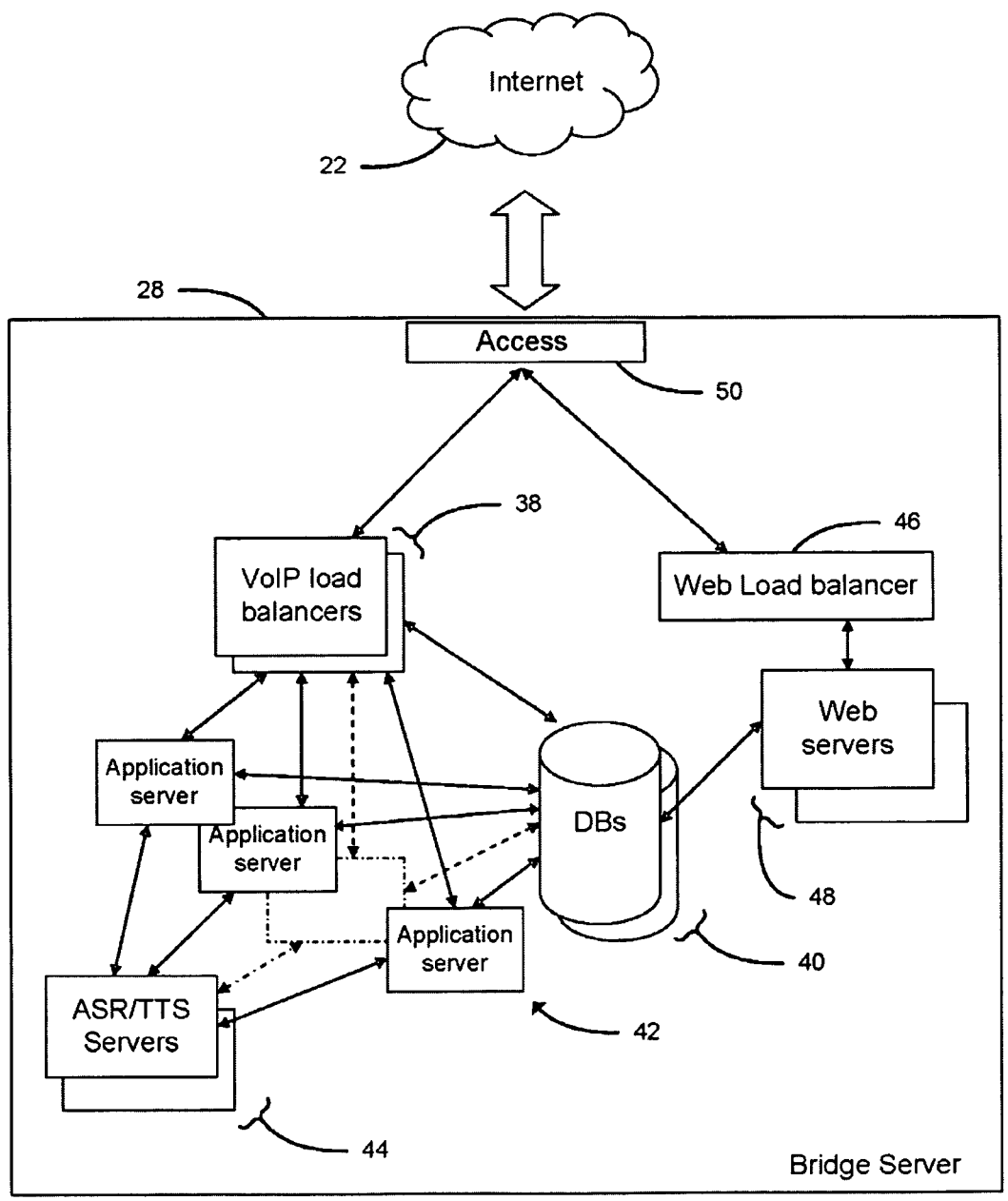
FIG. 2 is a block diagram showing a bridge server used for placing a call according to an embodiment of the subject matter described herein.

Now referring to FIG. 2, there is shown a bridge server 28 in accordance with an embodiment.

The bridge server 28 has an access 50 to the internet 22, one or more applications (herein illustrated as applications servers 42 each having one or more specific applications), one or more databases 40, one or more web servers 48, and one or more ASR/TTS Servers 44 (ASR=Automated Speech Recognition, TTS=Text-to-Speech).

If there are more than one application servers 42 as illustrated, an appropriate application server 42 is selected and called by one or more VoIP load balancers 38 connected the internet access 50 of the bridge server 28. The application servers 42 each have access to a respective one or more of the databases 40 and to the ASR/TTS Servers 44.

Optionally, the one or more applications within each application server 42 can, for example have instructions for placing calls, accessing ASR/TTS applications on servers 44, accessing data on databases 40, performing call-up functions through the use of specific interactive devices on any one of the contact voice interface device 14 and the subscribed voice interface device 16, via any one of the first and second IP switches 20 and 26 (refer to FIG. 1), dynamic call conferencing, bridging between different networks, dictating a message, group calling, transferring calls, voice mail services, managing user information, or any other desirable functions.

In one embodiment of the bridge server 28, a web load balancer 46 is used for managing Web connections via Internet access 50. Web load balancers 46 are in communication with the one or more Web servers 48. The Web servers 48 in turn have access to the one or more databases 40 to direct calls over the Internet 22, to the correct IP switches.

It is noted that when more than one database 40 is used to cover a given large geographical area of the globe, the group of databases 40 shall comprise synchronized databases 40 having the same content.

Referring now to both FIG. 1 and FIG. 2, in accordance with an embodiment of the present system and method, upon receipt of the first leg 32 of a call established from the first IP switch 20, one of the VoIP load balancers 38 comes into action. The selected VoIP load balancer 38 determines which one of the application servers 42 is available to service the call.

If the contact user 12 does not readily provide the identity of the subscribed user 18 (or of the subscribed voice interface device 16) to which the call is to be placed, the selected application server 42 acts as a prompting device to prompt the contact user to provide the identity of the subscribed user 18 (or of the subscribed voice interface device 16) to which he/she wishes to place the call.

Anyone of the application servers 42 can also act as a prompting device to prompt the contact user 12 to provide a contact identity (i.e., an identity of the contact user 12 which is to be announced to the subscribed user 18). Alternatively, a CLID (Calling Line Identification) can be used to determine the contact identity of the contact voice interface device 14. If it is determined that the contact voice interface device 14 is registered in any one of the databases 40 of the bridge server 28, the contact user's contact identity can be asserted and the prompting of the contact user 12 for his/her contact identity is no longer necessary.

If any one of the identity of the subscribed user 18 and the contact identity provided is a name stated by the contact user 12 using his/her contact voice interface device 14, the application server 42 requests the services of the ASR/TTS server 44 to recognize the stated name.

Alternatively, the contact user 12 can specify the identity of the subscribed user 18 either by dialing a phone number associated with the subscribed user 18, or by dialing a speed dial, a short code, a spell dialing or any other unique code which identifies the subscribed user 18 to be reached. His/her contact identity can also be provided by dialing a phone number associated with the contact user 12, or by dialing a speed dial, a short code, a spell dialing or any other unique code or username which permits an identification of the contact user 12 by the subscribed user 18.

If the identity of the subscribed user 18 provided by the contact user 12 is a generic identification code and does not provide the exact subscribed voice interface device 16 to which the call is to be placed, the selected application server 42 accesses at least one of the databases 40 to determine which subscribed voice interface devices 16 to use for the identified subscribed user 18; assuming a plurality of subscribed voice interface devices 16 has been registered for the same subscribed user 18. A subscribed user 18 can also have calling preferences registered by the system, in one of the databases 40.

Once the number of the subscribed voice interface device 16 to which the call is to be placed is known, the selected application server 42 accesses the database 40 which stores correspondences between subscribed voice interface devices 16 and their associated IP switches. At least one of the IP switches associated with a subscribed voice interface device 16 is illustrated by the second IP switch 26 in FIG. 1. The second IP switch directs the call to establish the second leg of the call 34 through the PSTN network 30. The database 40 can also have correspondences between identities of subscribed users 18 and their associated IP switches.

Once the second IP switch 26 is found, a selected application server 42 communicates the number of the subscribed voice interface device 16 to the second IP switch 26, which in turn uses this number to establish the second leg 34 of the call to the subscribed voice interface device 16 of the subscribed user 18.

The bridge server 28 then completes the call by one of the web servers 48 bridging the second leg 34 of the call to the first leg 32 of the call (or vice versa), through the Internet 22, from the first IP switch 20 to the second IP switch 26.

Before enabling the bridging of the first leg 32 and second leg 34 of the call, a selected application server 42 may perform a series of actions such as: (1) prompting the subscribed user 16 to accept or to refuse the completion of the call from the contact identity provided; (2) transferring the call from the contact user 12 to a voice recording device implemented by anyone of the application servers 42, the ASR/TTS servers 44 and the databases 40; (3) terminating the call; and (4) storing the contact identity provided on a list of contact users 12 in the database 40, the list identifying contact users 12 for which subsequent calls to a specific subscribed user 18 are to be automatically blocked. Option (4) can also be achieved by marking the contact identity as being a blocked contact. In one embodiment, the call is completed only upon acceptance of the call by the subscribed user 18 being contacted. The above actions are examples and other actions can also be performed by application servers 42 accessing any one of the databases 40 and ASR/TTS servers 44.

The above-described actions are performed based on the subscribed user's instructions given upon the prompting by the bridge server 28, via the second IP switch. The bridge server 28 then receives the subscribed user instructions via the second IP switch. The subscribed user instructions would then be one of: an acceptance of the call; a refusal of the call; an indication to transfer the call to a personal voice recording device; and an indication to block the contact user from subsequent calls.

The bridge server 28 then performs an action based on the instructions. The actions involve, for example, enabling the establishment of a communication over the Internet 22, to link or bridge the first IP switch 20 to the second IP switch 26, when the subscribed user instructions indicates an acceptance of the call. Alternatively, the completion of the call can be terminated when the subscribed user instructions indicates a refusal or simply hangs up. The call is transferred for completion to a personal voice recording device when the subscribed user instructions comprise the indication to transfer the call. The contact identity can also be sent for storage to the database 40 when the subscribed user instructions indicate to block the contact user.

It is noted that once the identity of the subscribed user 18 to which the call is to be placed is known, the bridge server 28 can access any one of the databases 40 to check any information related to that subscribed user 18. For example, the information checked can be a subscribed user profile, account information, call history, account credits and balances, access numbers, applicable call rates, and subscribed user status. Any charges associated with the placement of a call from a contact user 12 to the subscribed user 18 can then be deducted from the account of the subscribed user 18.

Figure 3:
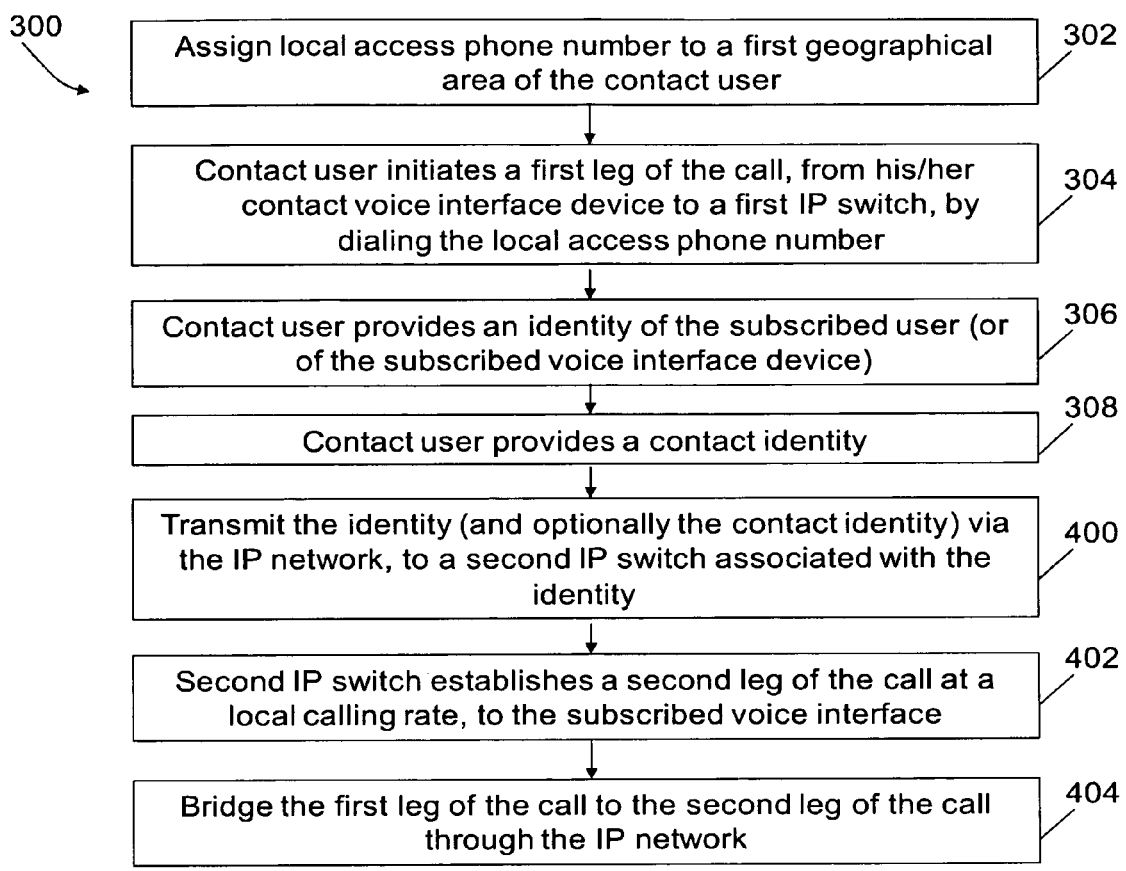
FIG. 3 is a flowchart showing a method for placing a call according to an embodiment of the subject matter described herein.

Now referring to FIG. 3, there is described a method 300 for placing a call through an IP network, from a contact voice interface device for use by a contact user located in a first geographical area, to a subscribed voice interface device for use by a subscribed user located in a second geographical area. Each of the geographical areas is an area within which a local call can be made.

In step 302, a local access phone number is assigned to the first geographical area.

In step 304, the contact user initiates a first leg of the call, from the contact voice interface device to a first IP switch, by dialing the local access phone number on his/her contact voice interface device.

The first leg of the call establishes a communication from the contact voice interface device to the first IP switch connected to the IP network, and comprises a connection through a PSTN network in the first geographical area.

In step 306, the contact user provides an identity of the subscribed user or of the subscribed voice interface device to which the call is to be completed. The identity provided by the contact user can be a username of the subscribed user, any type of public switch telephone network (PSTN) phone number, a VoIP number, a world type number (i.e., such as an 883 world number), or a subscribed user personal identity code previously given by the subscribed user to the contact user for example.

In step 308, the contact user provides a contact identity. In this step the contact user may be prompted for the contact identity if not readily provided before. The prompting may be achieved by the bridge server, via the IP network and the first IP switch. Step 308 is optional.

In step 400, the identity provided in step 306 (with optionally the contact identity provided in step 308) is transmitted from the first IP switch to a second IP switch via the IP network. The identity of the subscribed voice interface device provided in step 308 is used to find the second IP switch which is associated thereto, and from which a local call can be placed to reach the subscribed voice interface device.

In step 402, the second IP switch establishes a second leg of the call at a local calling rate, to the subscribed voice interface device. The second leg of the call establishes a communication from the subscribed voice interface device to the second IP switch.

In one embodiment, the second IP switch directs the call from the bridge server via the IP network to the subscribed voice interface device. The second leg of the call may or may not comprise a connection through the PSTN located in the second geographical area.

In step 404, the first leg of the call is bridged to the second leg of the call through the IP network, from the first IP switch to the second IP switch, thereby completing the call from the contact voice interface device to the subscribed voice interface device. The bridge server can be used to bridge the first and second legs of the call over the IP network.

In an embodiment of the above-described method, step 304 can have the first IP switch switching the call from the PSTN to a given URL which points to the bridge server accessible through the IP network.

Still in the above-described method and according to another embodiment, step 306 optionally involves prompting the contact user via the first IP switch, to provide an identity of the subscribed user or subscribed voice interface device to which a second leg of the call will be established.

In the above step 302, the first leg of the call initiated by the contact user optionally comprises caller identification information identifying the contact voice interface device from which the call originates. If this is the case, the contact identity may be known using the caller identification information and step 308 becomes no longer necessary.

In accordance with an embodiment, if the contact identity is known or provided by the contact user upon prompting in step 308, step 402 of the above-described method can have the second IP switch prompting the subscribed user to accept or refuse the establishment of the call from the contact identity. The contact identity can, for example, be played or displayed on the subscribed voice interface device before completing the call. If the subscribed user accepts the establishment of the call from the contact identity, the method proceeds to step 404 and the call is completed.

In the case where the subscribed user refuses the establishment of the call from the contact identity, step 402 can further involve prompting the subscribed user to choose from a plurality of options such as transferring the call to a personal voice recording system, recording a short message, terminating the call, and storing the contact identity in a list of contacts for which future calls are to be refused or blocked. The subscribed user is also free to hang-up, which terminates the placement of the call altogether.

The above described method may also have a final step of billing any call charges to the subscribed user. The charges can be associated with costs of initiating the first leg of the call in step 302; establishing of the second leg of the call in step 402; and bridging the first leg of the call to the second leg of the call via the IP network as in step 404.

It is also noted that in step 400, the identity of the subscribed voice interface device can be transited from the first IP switch to a bridge server over the IP network. The bridge server then accesses a database using the identity, to find an address of the second IP switch associated with the identity. The bridge server then sends a command to the second IP switch to establish the second leg of the call to the subscribed voice interface device associated with the identity.

While preferred embodiments of the invention have been described above and illustrated in the accompanying drawings, it will be evident to those skilled in the art that modifications may be made therein without departing from the essence of this invention. Such modifications are considered as possible variants comprised in the scope of the invention.

The invention claimed is:

1. A method for placing a call through an Internet Protocol (IP) network, from a contact voice interface device located in a first geographical area, to a subscribed voice interface device located in a second geographical area, each geographical area defined by an area in which a local call can be made via a PSTN, the method comprising:

receiving, at a first IP switch connected to both the PSTN and the IP network and assigned to the first geographical area, a first leg of the call from the contact voice interface device to a local access phone number assigned to the first IP switch, wherein the first IP switch is remotely located from the contact voice interface device;

subsequently receiving, at the first IP switch from the contact voice interface device, a first identity defining the subscribed voice interface device to which the call is to be completed, the first identity being different from a second identity defining the contact voice interface device;

prompting for the second identity using a first prompt;

transmitting, via the IP network, the first identity from the first IP switch to a second IP switch connected to the PSTN and assigned to the second geographical area, the second IP switch associated with the first identity;

the second IP switch establishing a second leg of the call at a local calling rate to the subscribed voice interface, wherein establishing a second leg of the call comprises prompting the first identity with a second prompt to accept and/or refuse an establishment of the call; and bridging the first leg of the call to the second leg of the call through the IP network, thereby completing the call from the contact voice interface device to the subscribed voice interface device through the IP network;

wherein upon receiving a refuse notification in response to the second prompt, further displaying a third prompt to choose from a plurality of options comprising: transferring the call to a personal voice recording system, terminating the call, and storing the second identity in a list of contacts for which further calls are to be refused.

2. The method as in claim 1, wherein the call is completed upon receiving the accept of the establishment of the call.

3. The method as in claim 1, wherein the first identity defining the subscribed voice interface device comprises one of: a username of a subscribed user, any type of telephone network phone number, a VoIP number, a world type number, and a subscribed user personal identity code.

4. The method as in claim 1, further comprising billing charges to a subscribed user account, the charges being associated with costs of performing at least one of:
the initiating of the first leg of the call;
the establishing of the second leg of the call; and
the bridging of the first leg of the call to the second leg of the call via the IP network.

5. The method as in claim 1, wherein the second leg of the call comprises a connection through a second telephone network in the second geographical area.

6. The method as in claim 5, further comprising the second IP switch switching the second leg of the call from the second telephone network to the IP network.

7. The method as in claim 5, wherein the first IP switch switches the first leg of the call from the first telephone network, to a given URL which points to a bridge server accessible via the IP network.

8. The method as in claim 7, wherein the second IP switch switches the second leg of the call from the second telephone network, to the given URL which points to the bridge server, the bridge server thereby linking the first and second legs of the call.

9. The method as in claim 8, wherein the transmitting the first identity defining the subscribed voice interface device from the first IP switch to the second IP switch comprises: transmitting the first identity to the bridge server; and the bridge server sending a command to the second IP switch to establish the second leg of the call to the subscribed voice interface device associated with the first identity.

10. The method as in claim 9, wherein the transmitting the first identity from the first IP switch to the second IP switch further comprises: the bridge server accessing a database to find an address of the second IP switch associated with the first identity, the database comprising a correspondence between the address and a plurality of identities of subscribed voice interface devices for use by a plurality of subscribed users located in the second geographical area.

11. The method of claim 1, wherein the step of receiving, at the first IP switch from the contact voice interface device comprises:
receiving a third identity, different from the first and second identities, and defining the subscribed user to which the call is to be completed; and
accessing at least one database, using a processor in communication with an application server, to determine the first identity associated with the third identity.

12. The method of claim 11, wherein the first identity associated with the third identity comprises a plurality of first identities, each defining a separate one of a plurality of subscribed user devices each associated with the same subscribed user.

13. A system for placing a call through an Internet Protocol (IP) network, from a contact voice interface device for use by a contact user located in a first geographical area, to a subscribed voice interface device for use by a subscribed user located in a second geographical area, each one of the first and second geographical areas being defined by an area in which a local call can be made, the system comprising:
a first IP switch, being remotely located from and locally accessible to the contact voice interface device, for establishing a first leg of the call upon receiving, from the contact voice interface device, a first identity defining the subscribed voice interface device, the first identity being different from a second identity defining the contact voice interface device, and the first IP switch having access to both the PSTN and the IP network, the first leg of the call being established by the contact voice interface device dialing a local access phone number assigned to the first IP switch and the first geographical area, wherein the first identity is received subsequent to the first leg of the call being established;
a second IP switch connected to both the PTSN and the IP network, for establishing a second leg of the call at a local calling rate, to the subscribed voice interface device, upon receiving the first identity defining the subscribed voice interface device from the first IP switch and the IP network;
a bridge server accessible via the IP network, for bridging the first leg of the call to the second leg of the call through the IP network thereby completing the call from the contact voice interface device to the subscribed voice interface device, and
a prompting device for prompting the second identity with a first prompt to provide the second identity, and prompting the first identity with a second prompt to accept and/or refuse establishment of the call,
wherein upon receiving a refuse notification in response to the second prompt, the prompting device further for displaying a third prompt to choose from a plurality of options comprising: transferring the call to a personal voice recording system, terminating the call, and storing the second identity in a list of contacts for which further calls are to be refused.

14. The system as in claim 13, wherein the bridge server further comprises:
a database comprising a correspondence between the second IP switch and a plurality of identities of subscribed voice interface devices for use by a plurality of subscribed users; and
an application coupled to the database, the application being configured for:
accessing the database to retrieve the second IP switch corresponding to the first identity; and
sending a command to the second IP switch, the command instructing the second IP switch to establish the second leg of the call to the subscribed voice interface device associated with the first identity; and
enabling the bridging of the first leg of the call to the second leg of the call upon the subscribed voice interface device choosing to accept the completion of the call from the second identity.

15. The system as in claim 14, wherein the application is further configured for one of:
terminating the completion of the call upon receiving a command to refuse the completion of the call from the contact voice interface device;
transferring the call for completion to the personal voice recording device upon the subscribed user choosing to transfer the call; and
sending the second identity for storage to the database upon the subscribed user choosing to refuse the completion of the call and to mark the second identity as a blocked contact.

16. A system for completing a call through an Internet Protocol (IP) network, from a first IP switch being locally accessible by a contact voice interface device for use by a contact user located in a first geographical area, to a second IP switch having local access to a subscribed voice interface device for use by a subscribed user located in a second geographical area, the system comprising:
a computer operating as a server and having access to the IP network;
a database coupled with the computer, the database comprising a correspondence between the second IP switch and a first identity defining the subscribed voice interface device, the first identity being different from a second identity defining the contact voice interface device; and
an application installed on the computer and coupled to the database, the application having machine readable instructions that when executed by a processor of the computer operate to:
upon a first leg of the call being established from the contact voice interface device to the first IP switch by the contact voice interface device dialing a local access phone number assigned to the first geographical area, subsequently receiving the first identity defining the subscribed voice interface device to which the call is to be completed from the contact voice interface device, wherein the first IP switch is remotely located from the contact voice interface device;
determining from the database the second IP switch corresponding to the first identity received;
prompting the second identity with a first prompt to provide the second identity;
transferring the first identity to the second IP switch to enable the second IP switch to establish a second leg of the call, at a local calling rate, to the subscribed voice interface device associated with the first identity;
prompting the first identity with a second prompt to accept and/or refuse establishment of the call; and
establishing a communication over the IP network, to both the first IP switch and the second IP switch, thereby linking the first leg of the call to the second leg of the call and completing the call when receiving an accept notification in response to the second prompt;
wherein upon receiving a refuse notification in response to the second prompt, further displaying a third prompt to choose from a plurality of options comprising: transferring the call to a personal voice recording system, terminating the call, and storing the second identity in a list of contacts for which further calls are to be refused.

17. The system as in claim 16, further comprising a plurality of computers for running servers in communication with each other via the IP network, each one of the computers for running servers having a respective database and a respective application for performing any one of:
the receiving the first identity defining the subscribed voice interface device;
the determining the second IP switch;
the transferring the first identity; and
the establishing a communication.

* * * * *

UNITED STATES PATENT AND TRADEMARK OFFICE
CERTIFICATE OF CORRECTION

| | |
|---|---|
| PATENT NO. | : 8,615,005 B2 |
| APPLICATION NO. | : 12/249605 |
| DATED | : December 24, 2013 |
| INVENTOR(S) | : Jerome Arnaud |

It is certified that error appears in the above-identified patent and that said Letters Patent is hereby corrected as shown below:

In the Claims

Column 10, Lines 62-63, "the prompting device further for displaying," should read --the prompting device further displaying--.

Signed and Sealed this
Ninth Day of September, 2014

Michelle K. Lee
*Deputy Director of the United States Patent and Trademark Office*